US011066588B2

(12) United States Patent
Lewis et al.

(10) Patent No.: US 11,066,588 B2
(45) Date of Patent: *Jul. 20, 2021

(54) DEICING COMPOSITION COMPRISING LIGNOCELLULOSIC BYPRODUCTS

(71) Applicant: Sustainable Fiber Technologies, LLC, Renton, WA (US)

(72) Inventors: Mark Lewis, Renton, WA (US); Sabrina Burkhardt, Renton, WA (US); Jessica Lewis, Renton, WA (US)

(73) Assignee: Sustainable Fiber Technologies, LLC, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,469

(22) Filed: Nov. 21, 2018

(65) Prior Publication Data

US 2019/0153280 A1 May 23, 2019

Related U.S. Application Data

(60) Provisional application No. 62/588,975, filed on Nov. 21, 2017.

(51) Int. Cl.
*C09K 3/18* (2006.01)
*C09K 5/08* (2006.01)
(Continued)

(52) U.S. Cl.
CPC .............. *C09K 3/185* (2013.01); *C09K 3/18* (2013.01); *C09K 3/22* (2013.01); *C09K 5/08* (2013.01); *C09K 5/10* (2013.01)

(58) Field of Classification Search
CPC . C09K 3/18; C09K 3/185; C09K 3/22; C09K 5/00; C09K 5/08; C09K 5/10
(Continued)

(56) References Cited

U.S. PATENT DOCUMENTS 2,592,983 A 4/1952 Von Hilderbrandt
4,372,811 A 2/1983 Samuelson et al.
(Continued)

FOREIGN PATENT DOCUMENTS

CA 2434215 A1 * 1/2004 ............. C09K 17/40
CA 2760840 3/2011
(Continued)

OTHER PUBLICATIONS

"Isolation and Characterization of organosolv lignin under alkaline condition form wheat straw" (J. M. Lawther, R. C. Sun, W. B. Banks, Int. J. of Polymer Analysis and Characterization, 3:2, 159-175 (1997).
(Continued)

*Primary Examiner* — Jane L Stanley
(74) *Attorney, Agent, or Firm* — Emerson, Thomson & Bennett, LLC; Roger D. Emerson; Peter R. Detorre

(57) ABSTRACT

Provided is a solvent borne deicing composition which includes in a solvent, a blend of an inorganic salt, a low molecular weight lignin in an amount of at least 5 weight % (or 10 or 15 or 20 weight %) to 30 or 40 or 50 weight % of the solids, and hemicellulose in an amount of at least 0.1 weight % (or 0.2 or 0.5 or 1.0 or 2.0 or 5.0 weight %) to 20 weight % (or 10 or 15 or 18 or 25 or 30 weight %) of the solids.

11 Claims, 2 Drawing Sheets

Biomass Substrate Samples – organic GPC analysis

(51) Int. Cl.
  *C09K 5/10* (2006.01)
  *C09K 3/22* (2006.01)
(58) Field of Classification Search
  USPC .......................................................... 252/74
  See application file for complete search history.

(56) References Cited

U.S. PATENT DOCUMENTS

| | | | |
|---|---|---|---|
| 4,698,225 A | 10/1987 | Morrison | |
| 4,728,393 A * | 3/1988 | Peel | C09K 3/18 162/16 |
| 4,746,449 A * | 5/1988 | Peel | C09K 3/18 162/16 |
| 4,786,438 A | 11/1988 | Blackmore | |
| 4,824,588 A * | 4/1989 | Lin | C09K 3/18 252/396 |
| 4,871,825 A | 10/1989 | Lin | |
| 4,952,415 A | 8/1990 | Winowiski et al. | |
| 4,988,520 A | 1/1991 | Overton | |
| 4,996,065 A | 2/1991 | Van de Walle | |
| 5,010,156 A | 4/1991 | Cook | |
| 5,281,434 A | 1/1994 | Winowiski et al. | |
| 5,312,632 A | 5/1994 | Simsa et al. | |
| 5,595,628 A | 1/1997 | Gordon et al. | |
| 5,786,007 A | 1/1998 | Webb | |
| 5,714,184 A | 2/1998 | Major | |
| 6,013,116 A | 1/2000 | Major et al. | |
| 6,113,974 A | 9/2000 | Winowiski et al. | |
| 6,506,318 B1 * | 1/2003 | Sapienza | C09K 3/18 252/70 |
| 6,605,232 B1 * | 8/2003 | Montgomery | C09K 3/185 106/13 |
| 7,070,709 B2 | 7/2006 | Schilling | |
| 7,514,018 B2 | 4/2009 | Schilling | |
| 8,268,121 B2 | 9/2012 | Blount | |
| 8,574,631 B2 | 11/2013 | Anderson | |
| 9,133,378 B2 * | 9/2015 | Maslow | C09K 3/185 |
| 2003/0156970 A1 | 8/2003 | Oberkofler et al. | |
| 2005/0247907 A1 * | 11/2005 | Sapienza | C07C 31/225 252/70 |
| 2006/0202156 A1 * | 9/2006 | Sapienza | C09K 3/18 252/70 |
| 2009/0314983 A1 * | 12/2009 | Sapienza | C09K 3/185 252/70 |
| 2011/0003352 A1 | 1/2011 | Retsina | |
| 2011/0073796 A1 * | 3/2011 | Dunuwila | C09K 5/10 252/70 |
| 2012/0108798 A1 | 5/2012 | Wenger et al. | |
| 2013/0175467 A1 * | 7/2013 | Bradt | C09K 3/18 252/70 |
| 2013/0217868 A1 | 8/2013 | Fackler et al. | |
| 2014/0249271 A1 | 9/2014 | Pietarinen | |
| 2014/0315254 A1 | 10/2014 | Gao | |
| 2014/0329999 A1 | 11/2014 | Friedl | |
| 2015/0122429 A1 | 5/2015 | Dybov | |
| 2015/0203774 A1 | 7/2015 | Lake | |
| 2016/0083635 A1 * | 3/2016 | Pylkkanen | C09K 3/185 252/70 |
| 2016/0229880 A1 | 8/2016 | Pietarinen | |
| 2016/0237194 A1 | 8/2016 | Pietarinen | |
| 2016/0244650 A9 * | 8/2016 | Pylkkanen | C09K 3/185 |
| 2016/0257791 A1 | 9/2016 | Pietarinen | |
| 2017/0226330 A1 | 8/2017 | Knudsen | |
| 2018/0002451 A1 | 1/2018 | Ge | |
| 2019/0062508 A1 | 2/2019 | Winsness | |
| 2019/0091643 A1 * | 3/2019 | Lewis | B01F 17/0092 |
| 2019/0161678 A1 * | 5/2019 | Lewis | C09K 17/50 |
| 2020/0369932 A1 * | 11/2020 | Kuykendall | C09K 3/185 |

FOREIGN PATENT DOCUMENTS

| | | |
|---|---|---|
| CA | 2936029 | 7/2015 |
| CN | 1042743 | 6/1990 |
| CN | 1438385 | 8/2003 |
| CN | 102746052 | 10/2012 |
| CN | 102704296 | 6/2014 |
| CN | 104628482 | 2/2015 |
| CN | 105130682 | 12/2015 |
| CN | 106495847 | 3/2017 |
| CN | 107382500 | 11/2017 |
| CN | 107417428 | 12/2017 |
| DE | 102009051884 | 5/2011 |
| EP | 2831088 | 2/2018 |
| FR | 2673941 | 9/1992 |
| WO | 2002037981 | 5/2002 |
| WO | 20120137204 | 10/2012 |
| WO | 20140124401 | 8/2014 |
| WO | 2015023580 | 2/2015 |
| WO | 2015104296 | 7/2015 |

OTHER PUBLICATIONS

Sun, Run-Cang and Lawther, J. Mark. "Isolation and Characterization of Organosolv Lignins from Wheat Straw". School of Agricultural and Firest Sciences University of Wales, Bangor, Gwynedd, UK, Wood and Fiber Science, 30(1) 1998 pp. 56-63, 1998 Society of Wood Science and Technology.
Lora, J. H. "Lignin Properties and Materials", "Chapter 23—Characteristics and Potential Applications of Lignin Produced by an Organosolv Pulping Process", 1989 American Chemical Society, pp. 312-323.
Nitsos, Christos, "Organosolv Fractionation of Softwood Biomass for Biofuel and Biorefinery Applications", Energies MDPI, Published Dec. 27, 2017.
Pan et al. (Biotechnology and Bioengineering, vol. 94, No. 5, Aug. 5, 2006, p. 851-861) (Year: 2006).
Lindner, Albert and Wegener, Gerd, Characterization of Lignins from Organosolv Pulping According to the Organocell Process Part 1. Elemental Analysis, Nonlignin Portions and Functional Groups, Journal of Wood Chemistry and Technology, vol. 8, 1988—Issue 3, 323-340, 1988.
Lawther, J. Mark; Sun, Run-Cang & Banks, W.B., Isolation and Characterization of Organosolv Lignin under Alkaline Condition from Wheat Straw. International Journal of Polymer Analysis and Characterization vol. 3, 1997, published online Sep. 24, 2006.
Lindner, Albert & Wegener, Gerd. "Characterization of Lignins from Organosolv Pulping According to the Organocell Process part 1. Elemental Analysis, Nonlignin Portions and Functional Groups", Journal of Wood Chemistry and TEchnology vol. 8, 1988—Issue 3, pp. 323-340, Published Online https://doi.org/10.1080/02773818808070688 Dec. 13, 2006.
Lora, Jairo. "Monomers, Polymers and Composites from Renewable Resources", "Chapter 10—Industrial Commercial Lignins: Sources, Properties and Applications" 2008, pp. 225-241.
International Search Report and Written Opinion for PCT App. No. PCT/US2020/039844 dated Oct. 22, 2020.
International Search Report and Written Opinion for PCT App. No. PCT/US2020/039858 dated Oct. 21, 2020.

* cited by examiner

DEICING COMPOSITION COMPRISING LIGNOCELLULOSIC BYPRODUCTS

BACKGROUND

A. Field

The present invention relates generally to deicing compositions comprising an inorganic salt and both lignin and sugar byproducts of cellulose production.

B. Description of the Related Art

Snow and ice cause significant hardship in cold climates. Major issues from freezing conditions are the loss of normal friction on surfaces and the buildup of ice. The consequences range from personal slip and fall injuries to collisions on the roadways and to economic losses in conveying material. Winter conditions especially pose significant problems at airports as the airline sector must combat snow and ice to keep runways open and to keep exposed aircraft components from freezing.

Such problems are addressed by applying a deicer to the road or ground surface. Deicers are formulated not only to reduce the freezing point temperature, but to have a persistent adhesion to the road, prevent refreezing, resist corrosion, and improve road surface friction. However, some areas where deicers are applied require low or no chloride content due to vegetation growing needs, environmentally sensitive areas, or requirements for concrete longevity. What is therefore needed in the art is a deicer composition which effectively reduces the freezing temperature and effectively adheres to the road or ground surface, prevents refreezing, resists corrosion and improves surface friction while lowering the amount of chloride or eliminating chloride as a component of the deicing composition. The deicing composition disclosed herein incorporates an aqueous lignin and hemicellulose dispersion similar to that which is disclosed within U.S. patent application Ser. No. 16/142,683, which is hereby incorporated by reference in its entirety. It is submitted that the present deicing composition provides all of the desired properties mentioned above which are sought after in a deicing composition.

SUMMARY

According to one embodiment, a solvent borne deicing composition comprises an inorganic salt, a solvent, lignin, and sugar compound.

According to one embodiment, the deicing composition comprises inorganic salt in an amount of 25 weight % (or 30.0 or 40 or 50 or 70 weight %) to 80 or 90 weight % solids.

According to one embodiment, the deicing composition comprises lignin in an amount of 5 weight % (or 10 or 15 or 20 or weight %) to 30 or 40 or 50 weight % solids According to one embodiment, the deicing composition comprises a sugar compound in an amount of 0.1 weight % (or 0.2 or 0.5 or 1.0 or 2.0 or 5.0 weight %) to 20 weight % (or 10 or 15 or 18 or 25 or 30 weight %) solids.

According to another embodiment, the sugar compound is a hemicellulose compound.

According to another embodiment, the sugar compound comprises an oligosaccharide.

According to an embodiment, at least 90 weight % (or 95 or 97 or 98 or 99 weight % or substantially all) of the lignin and hemicellulose compound may be derived from a non-wood source. According to further embodiments substantially all of the lignin and hemicellulose (i.e., greater than 99 weight %) is derived from a non-wood source.

According to another embodiment, the non-wood source of lignin and hemicellulose may comprise wheat straw, rice straw, barley straw, oat straw, rye grass, coastal Bermuda grass, arundo donax, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and flax straw.

According to one embodiment, the inorganic salt may be selected from the group consisting of magnesium chloride, calcium chloride, sodium chloride and blends thereof.

According to one embodiment, or wherein the inorganic salt is replaced with an organic compound selected from the group of Calcium Magnesium Acetate ($CaMg_2(CH_3COO)_6$), Potassium Acetate ($CH_3COOK$), Potassium Formate ($CHO_2K$), Sodium Formate ($HCOONa$), Calcium Formate ($Ca(HCOO)_2$), Urea ($CO(NH_2)_2$, (a common fertilizer) also used as additives to sodium chloride), Methanol ($CH_4O$), Ethanol ($CH_3CH_2OH$, often abbreviated as $C_2H_5OH$ or $C_2H_6$), Ethylene Glycol ($C_2H_6O_2$), Propylene Glycol ($C_3H_8O_2$), or Glycerol ($C_3H_8O_3$) (or glycerine, glycerin) and blends thereof.

According to one embodiment, the solvent comprises water.

According to another embodiment, the solvent comprises water and a water soluble alcohol.

According to another embodiment, the solvent comprises a $C_1$-$C_{10}$ alcohol in an amount less than 5% by volume (or 2.5 or 1% by volume) with respect to the solvent.

According to another embodiment, the deicing composition has a pH within the range of 7-10.

According to another embodiment, the lignin and sugar compound component of the deicing composition comprise less than 0.5 weight % (or 0.2 weight %, or 0.1 weight % or 500 ppm) of sulfur. According to a further embodiment, the lignin and sugar compound components of the deicing composition comprise greater than about 0.2 weight % to less than 0.5 weight % or from about 500 ppm to less than about 0.1 weight % sulfur.

According to another embodiment, the lignin has an average molecular weight of less than 3500 Daltons (Da) or less than 2500 Da or less than 1500 Da.

According to another embodiment, the lignin includes less than 0.01 weight % sulfonic groups.

According to another embodiment, the deicing composition includes the solvent free mixture of an inorganic salt, lignin, and sugar compound.

According to another embodiment, the solids may be substantially free of monosaccharides in that the solids include no monosaccharides to monosaccharides in an amount of less than 0.1 weight % (or 0.2 or 0.5 or 1.0 or 2.0 weight %) solids.

According to another embodiment, the deicing composition may be substantially free of anthraquninone (anthracenedione) in that the composition includes no anthraquninone to anthraquninone in an amount of less than 0.1 weight % (or 0.2 or 0.5 or 1.0 or 2.0 weight %) solids.

According to yet another embodiment, the deicing composition may comprise a liquor byproduct of cellulose pulp processing.

According to yet another embodiment, the deicing composition does not include chloride.

Also provided are methods of deicing a surface by applying a deicing composition according to the present disclosure to a surface.

In one embodiment, the method may comprise spraying a liquid deicing composition onto a surface.

In another embodiment, the method may comprise depositing a granular deicing composition onto a surface, the granular deicing composition comprising a granular inorganic salt coated with a liquid composition comprising a solvent, lignin and sugar.

In still another embodiment, the method of deicing a surface may comprise applying to the surface a liquid composition comprising a solvent, lignin and sugar, followed by application of an inorganic salt.

In still another embodiment, the method of deicing a surface may comprise applying a liquid composition comprising of solvent, lignin and sugar to a surface substantially simultaneous with the administration of an inorganic salt, that is, without premixing the inorganic salt and liquid composition of solvent, lignin and sugar Still other aspects and features of the deicing composition and associated methods are described in further detail below.

DETAILED DESCRIPTION

According to the present disclosure, in one embodiment a deicing composition comprises the solvent borne mixture of solids dispersed or suspended in a solvent, wherein the solids comprise a blend of inorganic salt, lignin and hemicellulose and the solvent comprises water and optionally an alcohol. For purposes herein, the term "hemicellulose" refers to the polysaccharides and oligosaccharides from wood and non-wood sources.

Solids

In one embodiment, the solids of the present deicing composition comprises a blend of inorganic salt, lignin and hemicellulose. The solids content of the deicing composition is substantially free of monosaccharides or contains no monosaccharides.

Suitable inorganic salts for use in the present deicing composition may include one or more of magnesium chloride, calcium chloride, potassium chloride and sodium chloride and blends thereof. In one embodiment, the organic salt may be selected from magnesium chloride and calcium chloride and mixtures thereof. In another embodiment, the inorganic salt may be magnesium chloride, sodium chloride, or calcium chloride.

While the present invention contemplates the use of inorganic salts, in other embodiments of the invention, all or a portion of the inorganic salt may be replaced with an organic compound such a compound selected from one or more of Calcium Magnesium Acetate ($CaMg_2(CH_3COO)_6$), Potassium Acetate ($CH_3COOK$), Potassium Formate ($CHO_2K$), Sodium Formate ($HCOONa$), Calcium Formate ($Ca(HCOO)_2$), Urea ($CO(NH_2)_2$, (a common fertilizer) also used as additives to sodium chloride), Methanol ($CH_4O$), Ethanol ($CH_3CH_2OH$, often abbreviated as $C_2H_5OH$ or $C_2H_6$), Ethylene Glycol ($C_2H_6O_2$), Propylene Glycol ($C_3H_8O_2$), or Glycerol ($C_3H_8O_3$) (or glycerine, glycerin).

The lignin component of the solids may be derived from any of a variety of wood and non-wood sources through a number of processes to separate lignin from cellulose pulp. The distinction between wood and non-wood sources of lignin is known in the art and is not further delineated herein. In a particularly useful embodiment, the lignin may be derived from a non-wood source. In another embodiment, greater than 80 or 85 or 90 or 95 or 99 weight % of the lignin may be derived from a non-wood source. In still a further embodiment, all or substantially all (i.e., greater than 99 weight %) of the lignin may be derived from a non-wood source. Particularly useful non-wood sources of lignin may include agricultural products and grasses and may include species such as wheat straw, rice straw, barley straw, oat straw, rye grass, coastal Bermuda grass, arundo donax, miscanthus, bamboo, sorghum, banana harvest residue, pineapple residue, sugarcane bagasse, nut shell waste, industrial hemp, recreational cannabis waste, nut shell residue, kenaf, switchgrass, succulents, alfalfa, corn stover, and, flax straw. Lignin from wood sources may include lignin derived from hardwood and softwood species.

Figure 1:
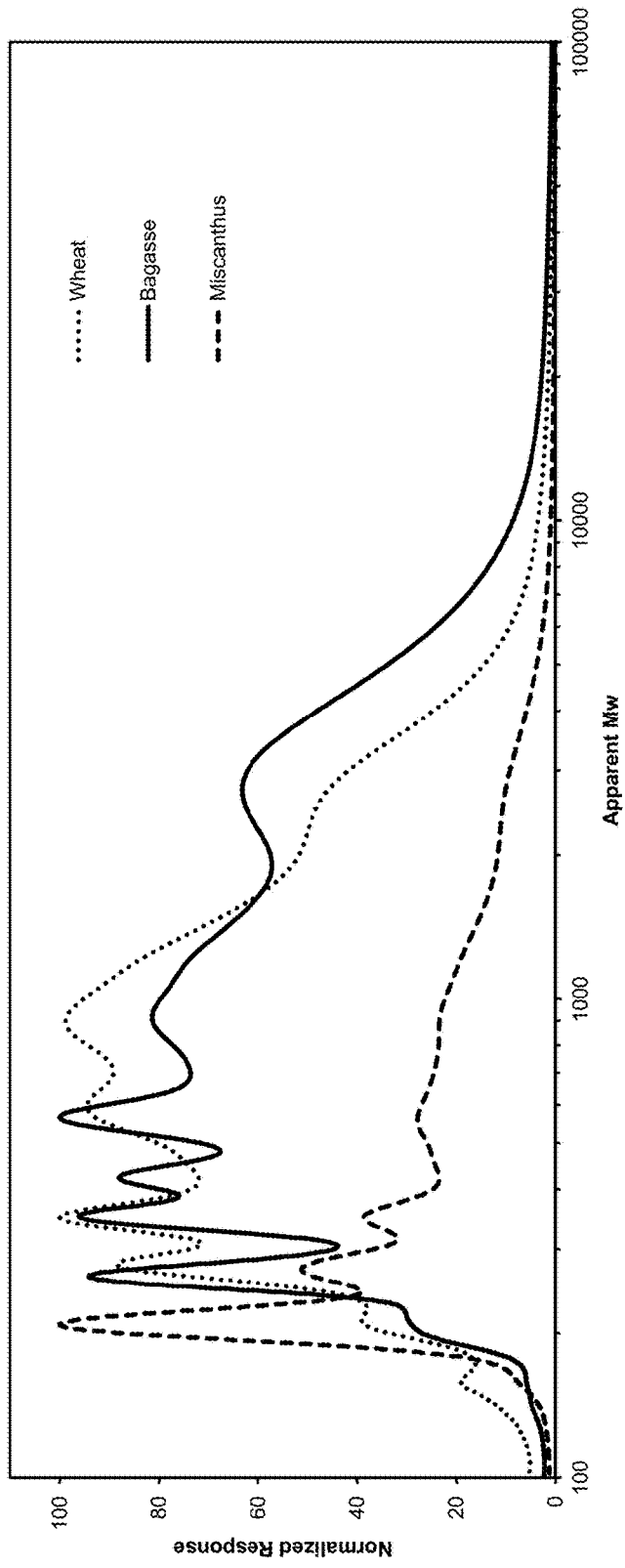
FIG. 1 is a graph which shows the number average molecular weight, weight average molecular weight, and polydispersity of wheat, bagasse and miscanthus.

Lignin molecular weight is known to vary in spent pulping liquors. As the lignin increases in molecular weight, it may precipitate out of solution or cause increases in viscosity which may cause challenges in spraying the deicer at low temperatures. Therefore, in certain embodiments, it is desirable to add polyelectrolytic functional groups such as sulfonic acids to counteract this effect. Without the addition of polyelectrolytic functional groups, such as sulfonic groups, lignin becomes less soluble in water at increasing molecular weights. However, in certain embodiments, it is also desirable to keep the amount of sulfur within the composition relatively low so as to minimize or eliminate toxicity associated with sulfur-containing compounds. Accordingly, in some embodiments, the average molecular weight of the lignin provided in the present invention may not exceed 3500 Da (or 2500 or 1500 Da) and will include less than 0.01% by weight of sulfonic groups. For example, the weight average molecular weight distribution of wheat straw, bagasse and miscanthus is provided within FIG. 1.

The solids of the present invention will further comprise a sugar compound, which in one embodiment, may comprise hemicellulose, that is, polysaccharides and oligosaccharides derived from wood or non-wood sources. For purposes herein, the term hemicellulose does not include monosaccharides. The hemicellulose component of the solids may be derived from any of a variety of wood and non-wood sources through a number of processes used to separate hemicellulose from cellulose pulp. The distinction between wood and non-wood sources of hemicellulose is known in the art and is not further delineated herein. In a particularly useful embodiment, the hemicellulose may be derived from a non-wood source. In another embodiment, greater than 80 or 85 or 90 or 95 or 99 weight % of the hemicellulose may be derived from a non-wood source. In still a further embodiment, all or substantially all (i.e., greater than 99 weight %) of the hemicellulose may be derived from a non-wood source. Particularly useful non-wood sources of hemicellulose may include agricultural products and grasses and may include species such as wheat straw, rice straw, barley straw, oat straw, rye grass, coastal Bermuda grass, arundo donax, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and, flax straw. Hemicellulose from wood sources may include hemicellulose derived from hardwood and softwood species.

In one embodiment, the sugar compound and lignin may be derived from the same source, which may be a non-wood or wood source or blend thereof.

In one embodiment, the solids may comprise inorganic salt in an amount of 25 weight % (or 30.0 or 40 or 50 or 70 weight %) to 80 or 90 weight % solids, lignin in an amount of 5 weight % (or 10 or 15 or 20 weight %) to 30 or 40 or 50 weight %) solids and the sugar compound in an amount of 0.1 weight % (or 0.2 or 0.5 or 1.0 or 2.0 or 5.0 weight %) to 20 weight % (or 10 or 15 or 18 or 25 or 30 weight %) solids.

In one embodiment, the sugar compound may comprise hemicellulose and is substantially free of monosaccharides in that it contains no monosaccharides to less than 0.1 weight % (or 0.2 or 0.5 or 1.0 or 2.0 weight %) of one or more monosaccharide sugar solids.

While the present invention contemplates that the components of the solids in the present deicing composition may be derived from wood and non-wood sources, the present invention may be practiced using synthetic sources of lignin and hemicellulose.

Solvent

The solvent of the deicing composition may, in many useful embodiments, comprise water. In still other embodiments, the solvent may comprise water and up to 10% by volume of a water miscible alcohol. In still another embodiment, the solvent may comprise less than 5% by volume (or 2.5 or 1% by volume) with respect to the solvent of a $C_1$-$C_{10}$ alcohol. In some embodiments, the solvent may be substantially free of a water miscible alcohol or a $C_1$-$C_{10}$ alcohol (i.e., contain no alcohol to less than 0.1% by volume of a water miscible alcohol or a $C_1$-$C_{10}$ alcohol).

Other Additives

Other additives in the deicing composition may include freeze point depressants, thickeners, dyes, stabilizers and the like.

The deicing composition may comprise sulfur in an amount not more than 0.5 weight % (or 0.2 weight %, or 0.1 weight % or 500 ppm). In some embodiments, the deicing composition may be substantially free of sulfur (i.e., the deicing composition may contain no sulfur to less than 500 ppm sulfur). In some instances, the deicing composition may comprise sulfur, wherein the source of the sulfur is the same as the source of the lignin. In this respect, sulfur derived from wood or non-wood pulp sources may be included in the deicing composition.

The deicing composition of the present disclosure is substantially free of anthraquninone (anthracenedione) in that it contains no anthraquninone to less than 0.1 weight % (or 0.2 or 0.5 or 1.0 or 2.0 weight %) anthraquninone. Anthraquinone is often utilized in the processing of wood and non-wood pulp sources.

The deicing composition of the present invention may be neutral to alkaline, that is, having a pH of about 7.0 and greater than 7.0. In some embodiments, the pH may be greater than 7.8 or 8.0 or 8.2 or 8.5. In some embodiments, the pH of the deicing composition may be between about 7 and about 10. In order to increase the pH of the deicing composition to the desired alkaline range, the deicing composition may comprise basic compounds in an amount suitable to adjust the pH of the deicing composition. A variety of basic compounds may be used. Exemplary basic compounds agents may include alkali metal carbonate and bicarbonate, such as sodium bicarbonate and calcium carbonate, hydroxide ion sources as alkali metal hydroxides, including, without limitation, sodium hydroxide, lithium hydroxide, and potassium hydroxide.

The deicing composition of the present invention may be prepared by mixing the solids and solvent in a suitable container and blending or agitating the mixture until the stable dispersion is achieved. As noted above, the pH of the deicing composition may be modified by addition of a suitable basic compound.

In another embodiment, the lignin and hemicellulose of the deicing composition of the present invention may derive from the processing of wood or non-wood pulp source materials. While many processes for separating cellulose from lignin and hemicellulose are known, the present invention is directed to deicing compositions comprising the lignin and hemicellulose byproducts of such processes. It is known that some processes for separating cellulose from lignin and hemicellulose involve dissolving lignin and hemicellulose from wood or non-wood sources using a solvent of some sort; however, these byproducts will typically exceed one or more of the sulfur, anthraquinone, or pH limits taught herein. Moreover, pulping processes that involve use of high temperatures (greater than about 150° C. typically yield byproducts that evidence high average molecular weight.

In still another embodiment, the solvent of the deicing composition of the present invention may comprise a portion of the fluid used in processing the wood or non-wood source from which at least a portion of the lignin and sugar solids in the deicing composition was derived. In some embodiments, all or substantially all of the solvent may be drawn from the fluid used in processing the wood or non-wood source from which all or substantially all of the lignin and sugar solids in the deicing composition was derived.

While the present invention contemplates a liquid deicing composition, in another embodiment, the invention may comprise a coated inorganic salt solid, that is, an inorganic salt solid, such as a salt crystal that is coated with a liquid composition comprising the solvent, lignin and sugar, optionally with other additives.

INDUSTRIAL APPLICATION

The deicing compositions of the present invention may be applied to surfaces that are iced or subject to icing, including, without limitation, road surfaces and bridges as well as vehicle surfaces, such as automobiles windshields.

In another embodiment, a method of deicing a surface may comprise applying to the surface a liquid composition comprising the solvent, lignin and sugar as described above, followed by application of an inorganic salt. Alternatively, the method may comprise applying the liquid composition of solvent, lignin and sugar to the surface substantially simultaneous with the administration of an inorganic salt, that is, without premixing the inorganic salt and liquid composition of solvent, lignin and sugar.

Solvent borne deicing compositions according to the invention may be applied by spraying.

In one embodiment, the deicing composition may be dehydrated to remove the solvent from the solids and the solids may be applied using a spreader.

Ice Melting Tests

Ice melting tests were conducting according to the protocol set forth by the Strategic Highway Research Program in SHRP 205.2 which is based on the work of Akin and Shi set forth in Akin, M. And Shi, X., "Development of Standard laboratory testing Procedures to Evaluate the Performance of Deicers," *Journal of Testing and Evaluation*, Vol. 40, No. 6, 2012, pp. 1015-1026, both of which are hereby incorporated by reference in their entireties.

The ice melt tests were run at 28° F. (−2.22° C.) and at various time intervals to provide a range of results. The following solutions were tested:

1. 23.3 wt. % NaCl brine made with reagent grade NaCL and distilled water
2. NaCl-WSL solution made at a 40 NaCl:60 WSL (by volume) blend, wherein WSL refers to wheat straw liquor
3. MgCl$_2$-WSL solution made at a 30 MgCl$_2$:70 WSL (by volume) blend, wherein WSL refers to wheat straw liquor The three solutions noted above were made 24 hours in advance of testing and were allowed to equilibrate to test temperature prior to application. 3.8 mL of solution were applied to ice lenses at the SubZero Facility at Montana State University. After 10, 20, 30, 45 and 60 minute intervals, the volume of liquid ice melt was measured using syringes. The ice melting rates were then determined and are shown in the sections below.

TABLE I

Ice Melt Rate of NaCl-WSL and NaCl Control at 28° F. (−2.22° C.)

| Time (min) | NaCl-VWS Ice Melt (mL/g) | | NaCl Control (mL/g) | |
|---|---|---|---|---|
| | Avg | Stdev | Avg | Stdev |
| 0 | 0.00 | 0.00 | 0.00 | 0.00 |
| 10 | 0.50 | 0.01 | 0.65 | 0.26 |
| 20 | 0.74 | 0.10 | 0.99 | 0.27 |
| 30 | 0.87 | 0.14 | 1.17 | 0.28 |
| 45 | 0.91 | 0.07 | 1.19 | 0.31 |
| 60 | 1.10 | 0.14 | 1.25 | 0.28 |

TABLE II

Ice Melt Rate of MgCl$_2$-WSL at 28° F. (−2.22° C.)

| Time (min) | MgCl$_2$-VWS Ice Melt (mL/g) | |
|---|---|---|
| | Avg | Stdev |
| 0 | 0.00 | 0.00 |
| 10 | 0.10 | 0.09 |
| 20 | 0.18 | 0.03 |
| 30 | 0.26 | 0.03 |
| 45 | 0.28 | 0.03 |
| 60 | 0.41 | 0.12 |

At 28° F. both the blended NaCl and MgCl$_2$ products bubbled as they were removed from the ice samples using a syringe. To ensure this did not impact the ice melt reading, the syringe was gently tapped to break the bubbles and the volume of melt was taken from the bottom of any remaining small bubbles.

From Table I, it can be observed that the NaCl-WSL blend showed an ice melt rate that is comparable to that of the NaCl control. After one hour (60 minutes), the NaCl-WSL blend had an ice melting capacity of 1.1±0.14 mL/g, and the NaCl control had an ice melting capacity of 1.25±0.28 mL/g. Thus, the ice melt capacity of the NaCl-WSL blend was not significantly different than the NaCl control. Table II also shows that the MgCl$_2$-WSL blend also exhibited ice melting properties at 28° F. (−2.22° C.).

Biochemical Oxygen Demand

Biochemical oxygen demand (also referred to as biological oxygen demand) refers to the amount of dissolved oxygen required by aerobic microbiological organisms to break down organic material that is present within a liquid sample at a certain temperature over a certain period of time. Non-wood sources of lignin and hemicellulose such as wheat straw liquor are readily suitable for use within deicing compositions. This is due to their relatively low biochemical oxygen demand compared to other materials which allows for easier degradation. For example, the biochemical oxygen demand for wheat straw liquor ranges from about 10,700 mg/L to about 12,700 mg/L. Other comparable materials such molasses and sugar beet concentrate have much a higher biochemical oxygen demand. For example, the biochemical oxygen demand of molasses is approximately 900,000 mg/L. Sugar beet concentrate exhibits a biochemical oxygen demand at levels which are similar to that of molasses. Without being bound to any particular theory, the difference in biochemical oxygen demand for non-wood sources of lignin and hemicellulose such as wheat straw liquor compared to other corrosion inhibitors such as molasses and sugar beet concentrate are believed to be due to the elimination or substantial elimination of monosaccharaides from the non-wood source of lignin and hemicellulose.

Corrosion Tests

Figure 2:
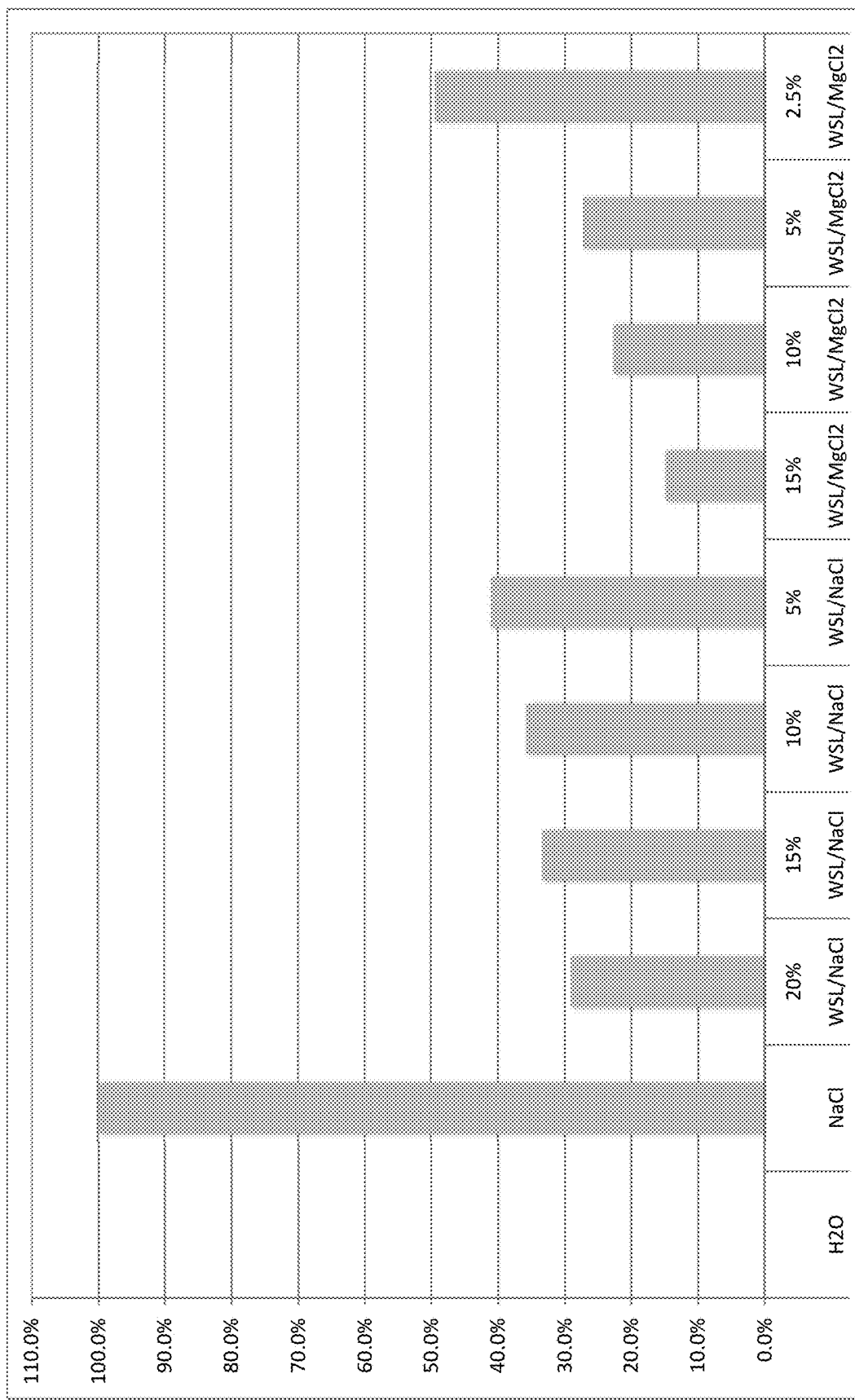
FIG. 2 is a graph which shows corrosion test results for various types deicing compositions.

Non-wood sources of lignin and hemicellulose may also act as a corrosion inhibitor. A corrosion inhibition test was conducted in accordance with the Pacific Northwest Snowfighters Snow and Ice Control Chemical Products Specifications and Test Porotocols for the PNS Association of British Columbia, Colorodo, Idaho, Montana, Oregon and Washington (2010) which is hereby incorporated by reference in its entirety. In the test, metal coupons were dipped into several different types of brine solutions and solutions comprising a blend of brine with wheat straw liquor over a period of 72 hours. As shown within the graph of FIG. 2, the metal coupon dipped within NaCl solution exhibited 100% or complete corrosion according to the corrosion test scale. The percentage of 100% corrosion is the largest amount of corrosion possible by the deicer in the test. In this instance, the NaCl brine corroded 0.217 g on average off the weight of the coupon used in the dip test. The blends shown in the graph of FIG. 2 alongside the NaCl brine show comparatively in percentage how much less other deicer compositions corroded each coupon which was calculated based on how much less the coupon weighed and how much weight the coupon lost after 72 hours. Metal coupons dipped within blends of wheat straw liquor and brine exhibited much lower corrosion levels ranging from about 15% to less than 50%, with the majority of samples exhibiting a corrosion level between about 20% to about 40%.

We claim:

1. A deicing composition comprising a solvent borne blend of solids, the solids comprising:
   (i) an inorganic salt in an amount of 25 or 30.0 or 40 or 50 or 70 weight % to 80 or 90 weight % solids
   (ii) lignin in an amount of 5 or 10 or 15 or 20 weight % to 30 or 40 or 50 weight % solids, and
   (iii) a sugar compound in an amount of 0.1 or 0.2 or 0.5 or 1.0 or 2.0 or 5.0 weight % to 10 or 15 or 18 or 20 or 25 or 30 weight % solids,
   wherein at least 90 or 95 or 97 or 98 or 99 weight % of the sugar compound is derived from hemicellulose,
   wherein the solvent comprises:
   a. water, and
   b. less than 5% by volume with respect to the solvent of a C$_1$-C$_{10}$ alcohol,
   and
   wherein the deicing composition has a pH in the range of 7.0 to 10, wherein pH is achieved by the addition of an alkali metal carbonate, an alkali metal bicarbonate or a hydroxide ion source to the deicing composition, wherein the deicing composition is substantially free of sulfur, wherein the deicing composition is substantially free of anthraquinone, wherein at least a portion of the lignin is derived from a non-wood source, wherein the non-wood source is selected from the group consisting of wheat straw, rice straw, barley straw, oat straw, rye grass, coastal Bermuda grass, arundo donax, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and flax straw.

2. The deicing composition of claim 1, wherein the lignin comprises less than 3500 Da average molecular weight.

3. The deicing composition of claim 1, wherein the solids is substantially free of monosaccharides in that the solids comprise monosaccharides in an amount of less than 2.0 weight % solids.

4. The deicing composition of claim 1, wherein substantially all of the hemicellulose is derived from a non-wood source.

5. The deicing composition of claim 4, wherein substantially all of the lignin is derived from a non-wood source.

6. The deicing composition of claim 5, wherein the non-wood source of hemicellulose is selected from the group consisting of wheat straw, rice straw, barley straw, oat straw, rye grass, coastal Bermuda grass, arundo donax, miscanthus, bamboo, sorghum, banana harvest residue, pineapple residue, sugarcane bagasse, industrial hemp, recreational cannabis waste, nut shell residue, kenaf, switchgrass, succulents, alfalfa, corn stover, and flax straw.

7. The deicing composition of claim 6, wherein the lignin includes less than 0.01 weight % sulfonic groups while remaining substantially free of sulfur.

8. The deicing composition of claim 1, wherein the inorganic salt is selected from the group consisting of magnesium chloride, calcium chloride, potassium chloride and sodium chloride and blends thereof.

9. A method of preventing development of ice on a surface, the method comprising applying to a surface the deicing composition according to claim 1.

10. A deicing composition comprising a solvent borne blend of solids, the solids comprising:
(i) an inorganic salt or an organic compound in an amount of 25 or 30.0 or 40 or 50 or 70 weight % to 80 or 90 weight % solids
(ii) lignin in an amount of 5 or 10 or 15 or 20 weight % to 30 or 40 or 50 weight % solids, and
(iii) a sugar compound in an amount of 0.1 or 0.2 or 0.5 or 1.0 or 2.0 or 5.0 weight % to 20 or 10 or 15 or 18 or 25 or 30 weight % solids, wherein at least 90 or 95 or 97 or 98 or 99 weight % of the sugar compound is derived from hemicellulose, wherein the solvent comprises:
a. water, and
b. less than 5% by volume with respect to the solvent of a $C_1$-$C_{10}$ alcohol,
and wherein the deicing composition has a pH in the range of 7.0 to 10, wherein pH is achieved by the addition of an alkali metal carbonate, an alkali metal bicarbonate or a hydroxide ion source to the deicing composition, wherein the deicing composition is substantially free of sulfur, wherein the deicing composition is substantially free of anthraquinone, and wherein the deicing composition comprises less than 0.5 weight % of sulfur.

11. The deicing composition of claim 10, wherein the inorganic salt is selected from the group consisting of magnesium chloride, calcium chloride, potassium chloride and sodium chloride and blends thereof or wherein the organic compound is selected from the group consisting of calcium magnesium acetate ($CaMg_2(CH_3COO)_6$), potassium acetate ($CH_3COOK$), potassium formate ($CHO_2K$), sodium formate (HCOONa), calcium formate ($Ca(HCOO)_2$), urea ($CO(NH_2)_2$, and blends thereof.

* * * * *